United States Patent Office 3,314,963
Patented Apr. 18, 1967

3,314,963
AZABENZOCYCLOALKANE-N-CARBOXAMIDINES
Richard C. Koch, Waterford, Conn., assignor to Chas. Pfizer & Co., Inc., New York, N.Y., a corporation of Delaware
No Drawing. Filed Sept. 19, 1963, Ser. No. 310,154
4 Claims. (Cl. 260—288)

The present application is a continuation-in-part of my co-pending U.S. patent application Ser. No. 211,878, filed July 23, 1962, now abandoned.

This invention relates to new and useful therapeutic agents. More particularly, it is concerned with novel carboxamidine compounds and with their pharmaceutically acceptable acid addition salts.

The compounds of the present invention may all be represented by the following structural formula:

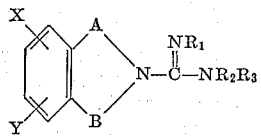

wherein X and Y are each members selected from the group consisting of hydrogen, hydroxy, mercapto, lower alkyl, lower alkoxy, trifluoromethyl, sulfamyl, amino, N-mono(lower alkyl)amino, N,N-di(lower alkyl)amino, cyano and halogen; A and B are each alkylene chains of from one to five carbon atoms and together total up to about six carbon atoms; and $R_1$, $R_2$ and $R_3$ are each members selected from the group consisting of hydrogen and lower alkyl, and when said $R_2$ and $R_3$ are taken together with the nitrogen atom to which they are attached complete a heterocyclic radical chosen from the group consisting of pyrrolidino, piperidino, piperazino, N-(lower alkyl)piperazino, morpholino and thiamorpholino, with at least one of said X, Y, $R_1$, $R_2$ and $R_3$ always being other than hydrogen when said A is ethylene and B is methylene. These compounds are all useful as potent regulators of the cardiovascular system. Further, they are particularly characterized as being especially active as hypotensive agents without having the drawback of causing emesis and hence, are unlike the prior art 1,2,3,4-tetrahydroisoquinoline-2-carboxamidine in this respect (the latter compound is disclosed by E. Haack et al. in U.S. Patent No. 2,951,843). They also possess other useful properties as well, such as vasodilatory action and as potent local anesthetics.

The compounds of this invention may be prepared by reacting an appropriate azabenzocycloalkane compound with an isothiouronium salt in a suitable solvent. Suitable solvents for this reaction include the lower alkanols, such as those, for example, containing up to five carbon atoms like methanol, ethanol, propanol, etc., dimethyl sulfoxide, dimethylformamide, and mixtures of these with water. The reaction is effected by maintaining the reactants in the chosen solvent or solvent mixture at a temperature of from about 20° C. up to about 200° C. for a period of from about two hours to about 96 hours. In preferred operations, the reaction temperature is from about 65° C. up to about 150° C. for a period of about 72 hours. The product is isolated from the reaction mixture by means of filtration and subsequent recovery of the resulting precipitate. The crude product so obtained may then be recrystallized from suitable solvents or mixtures of solvents.

Other methods may also be used to prepare the compounds of this invention. For instance, they may be prepared by reacting an azabenzocycloalkane compound with a cyanamide. Also, they may be prepared by reacting an azabenzocycloalkane with a cyanogen halide, followed by reaction of the resultant product with an amine. Still another method of preparing the compounds of the instant invention is to react an azabenzocycloalkane with a lower alkyl isothiocyanate to form the thiourea, alkylating the thiourea to introduce a lower alkyl group in the molecule giving an S-lower alkyl isothiouronium salt, and reacting this product with a substituted amine to give an azabenzocycloalkane-N-carboxamidine with substituents on the nitrogen atoms of the guanidine moiety.

Certain sub-classes of compounds are preferred in this invention. There are (a) compounds of the general formula:

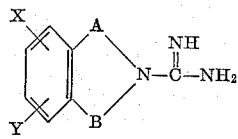

and their pharmaceutically acceptable acid addition salts, wherein X and Y are each members selected from the group consisting of hydrogen, hydroxy, mercapto, lower alkyl, lower alkoxy, trifluoromethyl, sulfamyl, amino, N-mono(lower alkyl)amino, N,N-di(lower alkyl)amino, cyano and halogen, and A and B are each alkylene chains of from one to five carbon atoms and together total up to about six carbon atoms, with at least one of said X and Y always being other than hydrogen when said A is ethylene and B is methylene; as well as (b) compounds of the general formula:

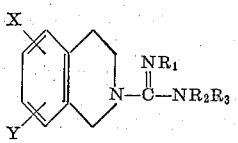

and their pharmaceutically acceptable acid addition salts, wherein X and Y are each members selected from the group consisting of hydrogen, hydroxy, mercapto, lower alkyl, lower alkoxy, trifluoromethyl, sulfamyl, amino, N-mono(lower alkyl)amino, N,N-di(lower alkyl)amino, cyano and halogen, and $R_1$, $R_2$ and $R_3$ are each members selected from the group consisting of hydrogen and lower alkyl, and when said $R_2$ and $R_3$ are taken together with the nitrogen atom to which they are attached complete a heterocyclic radical chosen from the group consisting of pyrrolidino, piperidino, piperazino, N-(lower alkyl)piperazino, morpholino and thiamorpholino, with at least one of said X, Y, $R_1$, $R_2$ and $R_3$ always including at least one member which is other than hydrogen; and (c) compounds of the general formula:

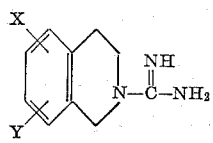

and their pharmaceutically acceptable acid addition salts, wherein X and Y are each members selected from the group consisting of hydrogen, hydroxy, mercapto, lower alkyl, lower alkoxy, trifluoromethyl, sulfamyl, amino, N-mono(lower alkyl)amino, N,N-di(lower alkyl)amino, cyano and halogen, with at least one of said X and Y always being other than hydrogen.

The synthesis of the tetrahydroisoquinoline carboxamidine compounds of the present invention may be illustrated by the following reaction sequence where the symbols employed are all as previously defined except for $R_4$ which is lower alkyl:

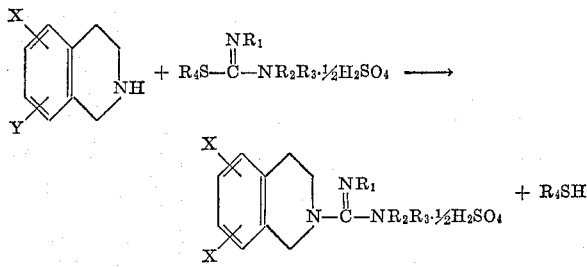

The acid addition salt which is obtained by the reaction illustrated above may be converted to the free base thereof by dissolving said salt in water and neutralizing the acid contained therein with a suitable alkaline reagent such as sodium hydroxide. The base may then be isolated from the water by means of extraction with an immiscible organic solvent and preferably with one of low volatility such as, for example, methylene chloride.

It is specifically intended to include other acid addition salts within the purview of this invention. These salts should be pharmaceutically acceptable and include, for example, the sulfate, hydrochloride, phosphate, maleate, acetate, citrate, succinate, tartrate, and others as well.

As previously indicated, the compounds of the present invention all exhibit hypotensive activity. For example, when 7-bromo-1,2,3,4-tetrahydroisoquinoline-2-carboxamidine sulfate is given orally to renal and neurogenic hypertensive dogs at 20 mg./kg. of body weight per day for four days, a pronounced decrease (always>15 mm. Hg) in blood pressure is observed.

The compounds of this invention may be administered alone, but are generally administered in conjunction with a pharmaceutically-acceptable carrier therefor selected on the basis of the chosen route of administration and standard pharmaceutical practice. For instance, they may be administered orally in the form of tablets containing such excipients as starch, milk sugar, certain types of clay, etc., or they may be administered in capsules either alone or on admixture with the same or equivalent excipients. They may also be administered orally in the form of elixirs or oral suspensions which may contain flavoring and/or coloring agents as well. They may also be injected parenterally, that is, for example, intravenously, intramuscularly or subcutaneously. For parenteral administration, they are best used in the form of a sterile aqueous solution which may also contain other solutes as well, e.g., sufficient saline or glucose to make the solution isotonic.

Further details can be seen from the following examples which are given for the purpose of illustration only and are not to be construed as limitations of this invention, many variations of which are possible without departing from the spirit or scope thereof.

*Example I.—7-bromo-1,2,3,4-tetrahydroisoquinoline-2-carboxamidine sulfate*

A solution containing 29.2 g. (0.2 mole) of 7-amino-3,4-dihydroisoquinoline and 96 ml. of 48% hydrobromic acid in 320 ml. of water is cooled to 0° C. under nitrogen with stirring. To the well-stirred solution, there is then added 15.2 g. (0.22 mole) of sodium nitrite in 180 ml. of water as rapidly as possible, while keeping the temperature below 5° C. The resulting wine-red solution is then added dropwise with vigorous stirring into 86 g. (0.3 mole) of cuprous bromide dissolved in a mixture of 200 ml. of 48% hydrobromic acid and 500 ml. of water. The resulting reaction mixture is then heated gradually to 75–80° C. until the evolution of nitrogen gas ceases. The mixture is then cooled, made basic with 50% potassium hydroxide and steam distilled. Extraction of the distillate with methylene chloride gives 27.3 g. of a yellow oil, which is subsequently dissolved in ethyl acetate and treated with dry hydrogen chloride gas to afford 32 g. (65% yield) of crude 7-bromo-3,4-dihydroisoquinoline hydrochloride as a white solid precipitate. This material has a melting point of 201–202.5° C. after one recrystallization from isopropanol.

*Analysis.*—Calcd. for $C_9H_8BrClN$: C, 43.8; H, 3.7; N, 5.7. Found: C, 44.1; H, 3.8; N, 5.7.

The above hydrochloride 13.6 g. (0.055 mole) is then dissolved in a minimum amount of water and to this solution there is added slowly, and in small increments, 2.1 g. (0.055 mole) of solid sodium borohydride. During the addition, more water is added as needed to keep the material in solution. Thereafter, the solution is stirred for another 30 minutes, made strongly basic with potassium hydroxide and extracted with methylene chloride. Evaporation of the dried extracts under reduced pressure then yields 10.6 g. of crude 7-bromo-1,2,3,4-tetrahydroisoquinoline as a yellow oil.

A mixture containing 10.6 g. (0.05 mole) of the crude 7-bromo-1,2,3,4-tetrahydroisoquinoline in 50 ml. of ethanol and 5.4 g. (0.04 mole) of S-methylisothiouronium sulfate is then refluxed for 68 hours, cooled and filtered to yield 10.2 g. of crude product. Recrystallization of the crude product from water yields 8.5 g. (70% yield) of 7-bromo-1,2,3,4-tetrahydroisoquinoline-2-carboxamidine sulfate. This compound melts at about 280° C. with decomposition.

*Analysis.*—Calcd. for $C_{10}H_{12}BrN_3 \cdot \frac{1}{2}H_2SO_4$: C, 39.7; H, 4.3; N, 13.9. Found: C, 39.9; H, 4.2; N, 13.7.

*Example II.—6,7-dimethoxy-1,2,3,4-tetrahydroisoquinoline-2-carboxamidine sulfate*

A mixture containing 36.8 g. (0.19 mole) of 6,7-dimethoxy-1,2,3,4-tetrahydroisoquinoline, 32.6 g. (0.17 mole) of S-methylisothiouronium sulfate and 250 ml. of methanol is refluxed for three days, cooled and filtered to yield the crude product. The resulting white solid material is recrystallized from a mixture of methanol and water to give 11.9 g. (24.7% yield) of product having a melting point of about 262° C. (dec.).

*Analysis.*—Calcd. for $C_{12}H_{17}N_3O_2 \cdot \frac{1}{2}H_2SO_4$: C, 50.7; H, 6.4; N, 14.8; S, 5.6. Found: C, 50.5; H, 6.4; N, 14.7; S, 5.7.

*Example III.—7-chloro-1,2,3,4-tetrahydroisoquinoline-2-carboxamidine sulfate*

This compound is prepared by the procedure of Example I except that 7-chloro-1,2,3,4-tetrahydroisoquinoline is reacted with S-methylisothiouronium sulfate. The compound has a melting point of about 267° C. (dec.).

*Example IV.—7-fluoro-1,2,3,4-tetrahydroisoquinoline-2-carboxamidine sulfate*

This compound is prepared by the procedure of Example I except that 7-fluoro-1,2,3,4-tetrahydroisoquinoline is reacted with S-methylisothiouronium sulfate. The compound has a melting point of about 278° C. (dec.).

Example V.—7-iodo-1,2,3,4-tetrahydroisoquinoline-2-carboxamidine sulfate

This compound is prepared by the procedure of Example I except that 7-iodo-1,2,3,4-tetrahydroisoquinoline is reacted with S-methylisothiouronium sulfate. The compound has a melting point of about 234° C. (dec.).

Example VI.—6-methoxy-1,2,3,4-tetrahydroisoquinoline-2-carboxamidine sulfate Following the procedure of Example II, 6-methoxy-1,2,3,4-tetrahydroisoquinoline is reacted with S-methylisothiouronium sulfate. The compound is obtained as a white solid having a melting point of about 263° C. (dec.).

Example VII.—7-methyl-1,2,3,4-tetrahydroisoquinoline-2-carboxamidine sulfate 7-methyl-1,2,3,4-tetrahydroisoquinoline is reacted with S-methylisothiouronium sulfate according to the procedure of Example II. The compound is obtained as a white solid having a melting point of about 256° C. (dec.).

Example VIII.—7-amino-1,2,3,4-tetrahydroisoquinoline-2-carboxamidine sulfate This compound is prepared by the procedure of Example I wherein 7-amino-1,2,3,4-tetrahydroisoquinoline is reacted with S-methylisothiouronium sulfate. The product is obtained as a white solid having a melting point of about 278° C. (dec.).

Example IX.—Isoindoline-2-carboxamidine sulfate 71.4 grams (0.6 mole) of isoindoline are reacted with 69.5 g. (0.5 mole) of S-methylisothiouronium sulfate according to the procedure of Example I except that 600 ml. of ethanol are now employed as solvent for the reaction. Isoindoline-2-carboxamidine sulfate is obtained as a crystalline product.

Example X.—N,N'-dimethyl-2,3,4,5-tetrahydro-1H-2-benzazepine-2-carboxamidine sulfate 88.2 grams (0.6 mole) of 2,3,4,5-tetrahydro-1H-2-benzazepine are reacted with 83.5 g. (0.5 mole) of N,N'-dimethyl-S-methylisothiouronium sulfate according to the procedure of Example IX. N,N'-dimethyl-2,3,4,5-tetrahydro-1H-2-benzazepine-2-carboxamidine sulfate is obtained as a crystalline product.

Example XI.—7-bromo-1,2,3,4-tetrahydroisoquinoline-2-carboxamidine

To prepare the free base, 10 g. of 7-bromo-1,2,3,4-tetrahydroisoquinoline-2-carboxamidine sulfate of Example I are suspended in 50 ml. of water and the resulting suspension is basified with sodium hydroxide. The free base is then extracted therefrom with several portions of methylene chloride. Concentration of the methylene chloride extracts yields the product, viz., 7-bromo-1,2,3,4-tetrahydroisoquinoline-2-carboxamidine.

Example XII.—7-bromo-1,2,3,4-tetrahydroisoquinoline-2-carboxamidine hydrochloride Following the procedure of Example I, 7-bromo-1,2,3,4-tetrahydroisoquinoline is reacted with S-methylisothiouronium hydrochloride. 7-bromo-1,2,3,4-tetrahydroisoquinoline-2-carboxamidine hydrochloride is obtained as a crystalline product.

Example XIII.—N,N'-dimethyl-2,3,4,5,6,7-hexahydro-8-methyl-1H-2-benzazonine-2-carboxamidine sulfate 113.4 grams (0.6 mole) of 2,3,4,5,6,7-hexahydro-8-methyl-1H-2-benzazonine are reacted with 83.5 g. (0.5 mole) of N,N'-dimethyl-S-methylisothiouronium sulfate according to the procedure of Example IX. N,N'-dimethyl-2,3,4,5,6,7-hexahydro-8-methyl-1H-2-benzazonine-2-carboxamidine sulfate is obtained as a crystalline product.

Example XIV

The procedure described in Example I is followed here to prepare the following additional compounds listed below from the appropriate starting materials (where all the symbols are as previously defined except for A' which is an anion):

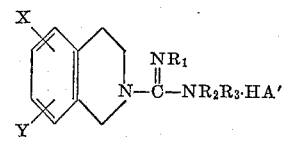

| X | Y | $R_1$ | $R_2$ | $R_3$ | HA' |
|---|---|---|---|---|---|
| 7-$CH_3$ | H | H | H | H | $H_2CO_3$ |
| 7-$CH_3O$ | H | H | H | H | $C_6H_5COOH$ |
| 7-$CH_3O$ | 8-Cl | H | H | H | HCl |
| 5-$CH_3O$ | H | H | H | H | $C_6H_5COOH$ |
| 5-$CH_3O$ | H | $CH_3$ | $CH_3$ | H | $H_2CO_3$ |
| 5-n-$C_4H_9O$ | H | H | H | H | $C_6H_5COOH$ |
| 5-n-$C_4H_9O$ | H | H | H | H | HCl |
| 5-n-$C_4H_9O$ | H | H | H | H | $\frac{1}{2}H_2SO_4$ |
| 5-Br | H | H | H | H | $\frac{1}{2}H_2SO_4$ |
| 5-Br | H | $CH_3$ | $CH_3$ | H | $C_6H_5COOH$ |
| H | H | $CH_3$ | $CH_3$ | H | HCl |
| 7-Br | H | $CH_3$ | $CH_3$ | H | p-$CH_3C_6H_4SO_3H$ |
| H | H | $CH_3$ | $CH_3$ | $CH_3$ | $C_6H_5COOH$ |

Example XV.—2,3,4,5-tetrahydro-1H-2-benzazepine-2-carboxamidine sulfate

The procedure described in Example X is followed except that an equivalent amount in moles of S-methylisothiouronium sulfate is employed in place of the corresponding N,N'-dimethyl compound used in the aforesaid example. In this particular case, the product obtained is 2,3,4,5-tetrahydro-1H-2-benzazepine-2-carboxamidine sulfate.

Example XVI.—2,3,4,5-tetrahydro-1H-3-benzazepine-3-carboxamidine

The procedure described in Example X is followed except that 2,3,4,5-tetrahydro-1H-3-benzazepine and S-methylisothiouronium benzoate are the two reactants employed instead of those previously used in the aforementioned example. Using the same molar proportions as in Example X, the product obtained in this particular case is 2,3,4,5-tetrahydro-1H-3-benzazepine-3-carboxamidine in the form of its benzoic acid addition salt.

Example XVII.—1-methyl-1,2,3,4-tetrahydroisoquinoline-2-carboxamidine hydrochloride Cyanogen bromide (105.9 g., 1.0 mole) is added dropwise to a stirred mixture containing 150.7 g. (1.0 mole) of 1-methyl-1,2,3,4-tetrahydroisoquinoline, 138.4 g. (1.0 mole) of potassium carbonate, 170 ml. of water and 150 ml. of benzene, with occasional cooling to keep the temperature of the mixture from rising above 30° C. The reaction mixture is then stirred at room temperature (~25° C.) overnight, the layers are separated and the aqueous layer is extracted with benzene. The combined benzene fractions are then washed once with 10% aqueous sodium carbonate and twice with 1N hydrochloric acid, dried over anhydrous sodium sulfate and concentrated under reduced pressure. Distillation of the residual material in vacuo then gave 115.5 g. (67%) of N-cyano-1-methyl-1,2,3,4-tetrahydroisoquinoline, B.P. 120–126° C./0.04 mm. Hg; $n_D^{22°}$ 1.5595.

A mixture of 3.42 g. (0.02 mole) of N-cyano-1-methyl-1,2,3,4-tetrahydroisoquinoline with 1.2 g. (0.022 mole) of ammonium chloride is next heated to 260–265° C. under a nitrogen atmosphere for 1.5 hours. The crude mixture is then cooled and subsequently crystallized from acetonitrile to yield 1.56 g. (35%) of 1-methyl-1,2,3,4 - tetrahydroisoquinoline - 2 - carboxamidine hydrochloride, M.P. 253.5–254–5° C.

*Anaylsis.*—Calcd. for $C_{11}H_{15}N_3 \cdot HCl$: C, 58.33; H, 7.15; N. 18.62. Found: C, 58.46; H, 6.91; N, 18.51.

Example XVIII

The procedure described in Example XVII is followed to prepare the additional compounds listed below from the appropriate starting materials (viz., the proper N-cyano-1,2,3,4-tetrahydroisoquinoline compound and the appropriate amine salt):

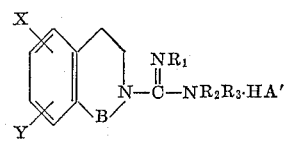

| X | Y | B | R₁ | R₂ | R₃ | HA' |
|---|---|---|----|----|----|-----|
| 7-SO₂NH₂ | H | CH₂ | H | CH₃ | CH₃ | HCl |
| 5-OH | H | CH₂ | H | CH₃ | CH₃ | HCl |
| H | H | CH₂ | H | CH₃ | H | HCl |
| H | H | CH₂ | H | CH₃ | CH₃ | HCl |
| 7-Br | H | CH₂ | H | CH₃ | CH₃ | p-CH₃C₆H₄SO₃H |
| 7-Br | H | CH₂ | H | CH₃ | C₂H₅ | HCl |
| 7-Br | H | CH₂ | H | —(CH₂)₄— | | HCl |
| 7-Br | H | CH₂ | H | —(CH₂)₅— | | C₆H₅COOH |
| 7-Br | H | CH₂ | H | —(CH₂)₂O(CH₂)₂— | | C₆H₅COOH |
| 7-Br | H | CH₂ | H | —(CH₂)₂S(CH₂)₂— | | C₆H₅COOH |
| 7-Br | H | CH₂ | H | —(CH₂)₂NCH₃(CH₂)₂— | | 2C₆H₅COOH |
| 6-SH | H | CH₂ | H | CH₃ | CH₃ | HCl |
| 6-SO₂NH₂ | 7-CH₃ | CH₂ | H | H | H | HCl |

Example XIX.—N,N-dimethyl-1,2,3,4-tetrahydroisoquinoline-2-carboxamidine sulfate The above compound is prepared by reacting 0.06 mole of 1,2,3,4-tetrahydroisoquinoline and 0.05 mole of N,N-dimethyl-S-methylisothiouronium sulfate according to the procedure of Example I.

Example XX.—N,N'-dimethyl-1,2,3,4-tetrahydroisoquinoline-2-carboxamidine sulfate The above compound is prepared by reacting 0.06 mole of 1,2,3,4-tetrahydroisoquinoline and 0.05 mole of N,N'-dimethyl-S-methylisothiouronium sulfate according to the procedure of Example I.

Example XXI

The following comounds are prepared by employing the procedures of Example I or XVII, as desired, and then subjecting the resulting salt intermediate to the procedure of Example XI:

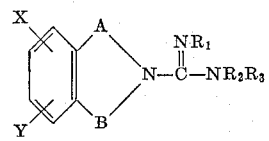

| X | Y | A | B | R₁ | R₂ | R₃ |
|---|---|---|---|----|----|----|
| 8-CN | H | CH₂CH₂ | CH₂ | H | H | H |
| 6-CF₃ | H | CH₂CH₂ | CHCH₃ | H | H | H |
| 7-C₂H₅NH | H | CH₂CH₂ | CH₂ | CH₃ | CH₃ | CH₃ |
| 5-(CH₃)₂N | H | CH₂CH₂ | CH₂ | H | H | H |
| H | H | CH₂CH₂ | CHCH₃ | H | —(CH₂)₄— | |
| H | H | CH₂CH₂ | CH₂ | H | —(CH₂)₅— | |
| H | H | CH₂CH₂ | CHCH₃ | H | —(CH₂)₂O(CH₂)₂— | |
| 6-CH₃ | 7-CH₃ | CH₂CH₂ | CH₂ | H | —(CH₂)₂S(CH₂)₂— | |
| H | H | CH₂CH₂ | CH₂ | H | —(CH₂)₂NH(CH₂)₂— | |
| H | H | CH₂CH₂ | CH₂ | H | —(CH₂)₂NC₂H₅(CH₂)₂— | |
| 6-Cl | 7-Cl | CH₂CH₂ | CH₂ | H | H | H |
| 7-CF₃ | H | CH₂CH₂ | CH₂ | H | CH₃ | H |
| H | H | CH₂ | (CH₂)₅ | H | H | H |
| 6-NH₂ | H | CH₂CH₂ | CH₂ | H | C₂H₅ | C₂H₅ |
| 7-(C₂H₅)₂N | H | CH₂CH₂ | CH₂ | H | H | H |
| H | H | CH₂CH₂ | CH₂ | H | n-C₃H₇ | H |
| 6-Br | 7-Br | CH₂CH₂ | CH₂ | H | H | H |
| H | H | (CH₂)₃ | (CH₂)₃ | H | H | H |
| 7-C₂H₅ | H | CH₂CH₂ | CH₂ | H | H | H |
| 6-OC₃H₇ | H | CH₂CH₂ | CH₂ | H | CH₃ | CH₃ |

What is claimed is:
1. A compound of the formula:

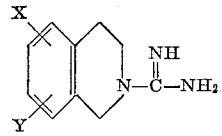

wherein X and Y are each members selected from the group consisting of hydrogen, and halogen, with at least one of said X and Y always being halogen.
2. 7 - halo - 1,2,3,4 - tetrahydroisoquinoline - 2 - carboxamidine.
3. 7 - bromo - 1,2,3,4- - tetrahydroisoquinoline - 2 - carboxamidine.
4. 7 - chloro - 1,2,3,4 - tetrahydroisoquinoline - 2 - carboxamidine.

(References on following page)

References Cited by the Examiner

UNITED STATES PATENTS

| | | | |
|---|---|---|---|
| 2,876,222 | 3/1959 | Bloom | 260—288 X |
| 2,876,229 | 3/1959 | Bloom | 260—288 |
| 2,951,843 | 9/1960 | Haack | 260—288 |
| 3,056,789 | 10/1962 | Urech | 260—286 |
| 3,093,632 | 6/1963 | Mull | 260—239 |
| 3,157,573 | 11/1964 | Wenner | 167—155 |
| 3,178,348 | 4/1965 | Bickerton | 167—65 |

OTHER REFERENCES

Burger: Medicinal Chemistry, 2nd Ed., Interscience, 1960, p. 43.

ALEX MAZEL, *Primary Examiner.*

NICHOLAS S. RIZZO, HENRY R. JILES, *Examiners.*

D. G. DAUS, *Assistant Examiner.*